(12) United States Patent
Balman

(10) Patent No.: US 11,739,875 B2
(45) Date of Patent: Aug. 29, 2023

(54) FLUID INTRODUCER TO A PIPING SYSTEM

(71) Applicant: James Robert Balman, Mundelein, IL (US)

(72) Inventor: James Robert Balman, Mundelein, IL (US)

(*) Notice: Subject to any disclaimer, the term of this patent is extended or adjusted under 35 U.S.C. 154(b) by 183 days.

(21) Appl. No.: 17/077,726

(22) Filed: Oct. 22, 2020

(65) Prior Publication Data
US 2021/0123552 A1 Apr. 29, 2021

Related U.S. Application Data

(60) Provisional application No. 62/924,955, filed on Oct. 23, 2019.

(51) Int. Cl.
*F16L 41/04* (2006.01)
*F16L 25/12* (2006.01)
*F16L 55/105* (2006.01)

(52) U.S. Cl.
CPC ............ *F16L 41/045* (2013.01); *F16L 25/12* (2013.01); *F16L 55/105* (2013.01)

(58) Field of Classification Search
CPC ........ F16L 41/045; F16L 25/12; F16L 55/105
See application file for complete search history.

(56) References Cited

U.S. PATENT DOCUMENTS

| 2,645,244 A | 7/1953 | Klickman |
| 2006/0220383 A1 | 10/2006 | Erickson |

FOREIGN PATENT DOCUMENTS

KR  10-1875796 B1  7/2018

OTHER PUBLICATIONS

International Search Report and Written Opinion, Application No. PCT/US2020/056903, dated Jan. 26, 2021, pp. 10.

*Primary Examiner* — Kevin R Barss
(74) *Attorney, Agent, or Firm* — Stinson LLP

(57) ABSTRACT

The present disclosure provides a fluid introducer for a piping system that includes first and second piping sections. The fluid introducer provides a direct connection to the first piping section through a separator body configured to be positioned in an expansion gap between the first piping section and the second piping section such that a first end face of the separator body faces the first piping section and a second end face of the separator body faces the second piping section. The fluid introducer is configured to direct fluid from the fluid source through fluid introduction passaging into the first piping section and block the fluid from flowing into the second piping section.

17 Claims, 6 Drawing Sheets

FLUID INTRODUCER TO A PIPING SYSTEM

CROSS-REFERENCE TO RELATED APPLICATION

This application claims priority to U.S. Provisional Patent Application Ser. No. 62/924,955, filed Oct. 23, 2019, and entitled FLOW ASSEMBLY FOR LIMITED ACCESS, which is hereby incorporated by reference in its entirety.

FIELD

The present disclosure generally relates to a fluid introducer for a piping system.

BACKGROUND

Embodiments of the present disclosure generally relate to systems for introducing fluid (e.g., cleaning fluid) into defined sections of a piping system, e.g., a chemical or industrial process such as an oil refinery. Occasionally it is necessary to take the piping system offline to introduce non-process fluid such as chemical cleaners into defined sections of the piping system. When this occurs, it is sometimes necessary to isolate the defined section of the piping system from adjacent sections so that the non-process fluid only flows locally within the defined section. The typical process involves disconnecting the defined piping section from the remainder of the piping system by removing an adjacent section of pipe from the piping system so that a temporary fluid introduction system may be installed. The present inventor has recognized that this process requires an extensive amount of process downtime to complete, which can be very costly to the operator of the piping system.

BRIEF SUMMARY

In one aspect, a fluid introducer for a piping system comprising a first piping section and a second piping section configured for direct connection to the first piping section comprises a separator body having a first end face, a second end face spaced apart from the first end face along an axis, and a perimeter portion extending along the axis from the first end face to the second end face. The separator body is configured to be positioned in the piping system between the first piping section and the second piping section such that the first end face faces the first piping section and the second end face faces the second piping section. The first end face defining an outlet port. An inlet fitting adjacent the perimeter portion of the separator body is configured to fluidly connect the fluid introducer to a fluid source. A fluid introduction passaging provides fluid communication from the inlet fitting to the outlet port. When the separator body is positioned in the piping system between the first piping section and the second piping section, the fluid introducer is configured to direct fluid from the fluid source through the fluid introduction passaging into the first piping section and block the fluid from flowing into the second piping section. The separator body is configured to be received in an expansion gap between the first piping section and the second piping section allowed by an expansion joint of the piping system.

In another aspect, a fluid introducer for a piping system comprising a first piping section and a second piping section configured for direct connection to the first piping section comprises a separator body having a first end face, a second end face spaced apart from the first end face along an axis, and a perimeter portion extending along the axis from the first end face to the second end face. The separator body is configured to be positioned in the piping system between the first piping section and the second piping section such that the first end face faces the first piping section and the second end face faces the second piping section, the first end face defining an outlet port. An inlet fitting adjacent the perimeter portion of the separator body is configured to fluidly connect the fluid introducer to a fluid source. Fluid introduction passaging provides fluid communication from the inlet fitting to the outlet port. When the separator body is positioned in the piping system between the first piping section and the section of the pipe, the fluid introducer is configured to direct fluid from the fluid source through the fluid introduction passaging into the first piping section and block the fluid from flowing into the second piping section. The separator body has a thickness extending from the first end face to the second end face and the thickness is less than 0.3-times a pipe diameter of the first and second piping sections.

In another aspect, a method of introducing fluid into a first piping section of a piping system without introducing the fluid into a second piping section of the piping system that is directly connected to the first piping section disconnecting the first piping section and the second piping section. One of the first piping section and the second piping section is moved away from the other of the first piping section and the second piping section using an allowance of an expansion joint of the piping system without removing any of the first piping section or the second piping section from the piping system to create an expansion gap between the first piping section and the second piping section. A fluid introducer is installed into the expansion gap. The fluid introducer is configured to discharge fluid imparted into the introducer on one side of the introducer while preventing the fluid from being discharged on an opposite side. Fluid is introduced into the first piping section via the fluid introducer in the expansion gap.

Other aspects and features will be understood hereinafter.

BRIEF DESCRIPTION OF DRAWINGS

For a better understanding of the nature and objects of the disclosure, reference should be made to the following detailed description taken in conjunction with the accompanying drawings, in which.

Reference is made in the following detailed description of preferred embodiments to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim.

DETAILED DESCRIPTION

Figure 1:
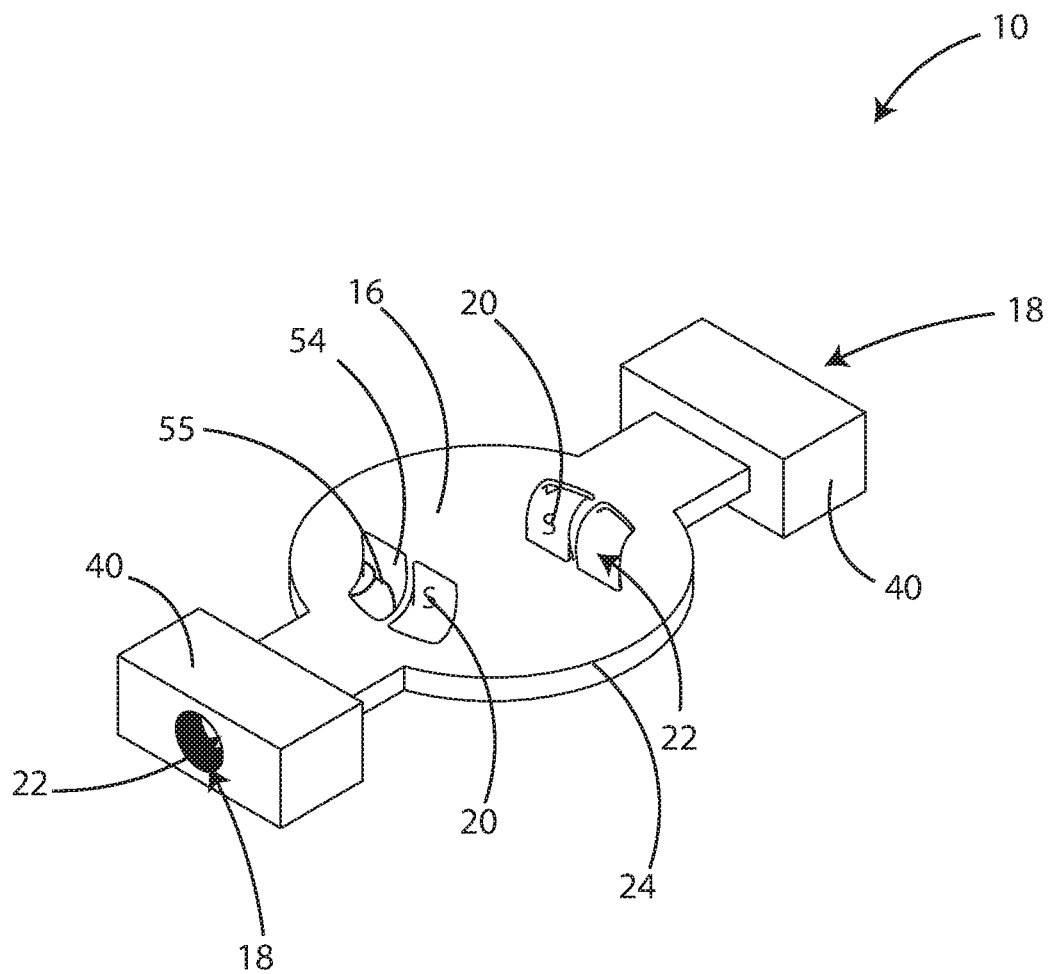
FIG. 1 is an isometric view of a fluid introducer.
Figure 2:
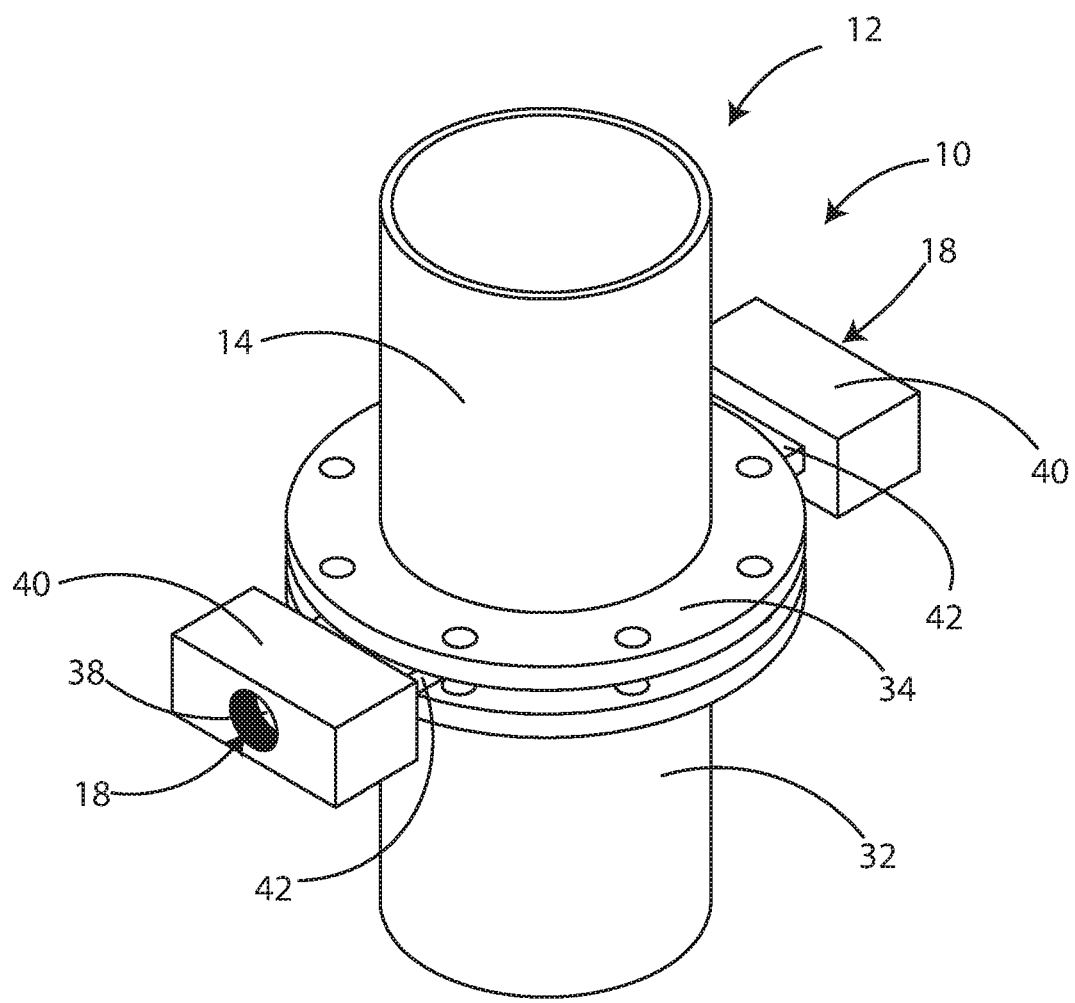
FIG. 2 is an illustration of the fluid introducer installed in a piping system between a first piping section and a second piping section.

The present disclosure provides a fluid introducer 10 for a piping system 12, as illustrated in FIGS. 1-2. The fluid introducer 10 of the present disclosure may couple to the piping system 12 for introducing fluid from a fluid source (not shown) into a first piping section 14 of the piping system. The fluid introducer 10 includes a separator body 16 configured to be received in the piping system 12 in a small gap 34 that is formed along the axis of the piping system 12 between the first piping section 14 and a second piping section 32. As explained more fully below, positioning the separator body 16 in this small gap 34 enables the fluid introducer 10 to be used without removing any portion of the piping system 12, which substantially reduces the downtime required in comparison with prior art fluid introduction techniques. The fluid introducer 10 further includes a plurality of inlet fittings 18 (broadly, one or more inlet fittings), a plurality of outlet ports 20 (broadly, one or more outlet ports), and fluid introduction passaging 22. The fluid introduction passaging extends through the separator body 16 so as to provide fluid communication from the inlet fittings 18 to the outlet ports 20. As will be explained more fully below, the separator body 16 is configured to direct fluid introduced in the fluid introduction passaging 22 to flow into the first piping section 14 at a high flow rate while blocking the fluid from entering the second piping section 32. In the illustrated embodiment, the introducer 10 comprises two sets of inlet fittings 18, outlets 20, and passages 22 at diametrically spaced locations about the center axis 30. However, it will be understood that other introducers can have other numbers of these components, which may be determined based on the spacing between the bolt holes that connect the first and second piping sections, the required flow rate capacity, etc.

Figure 3:
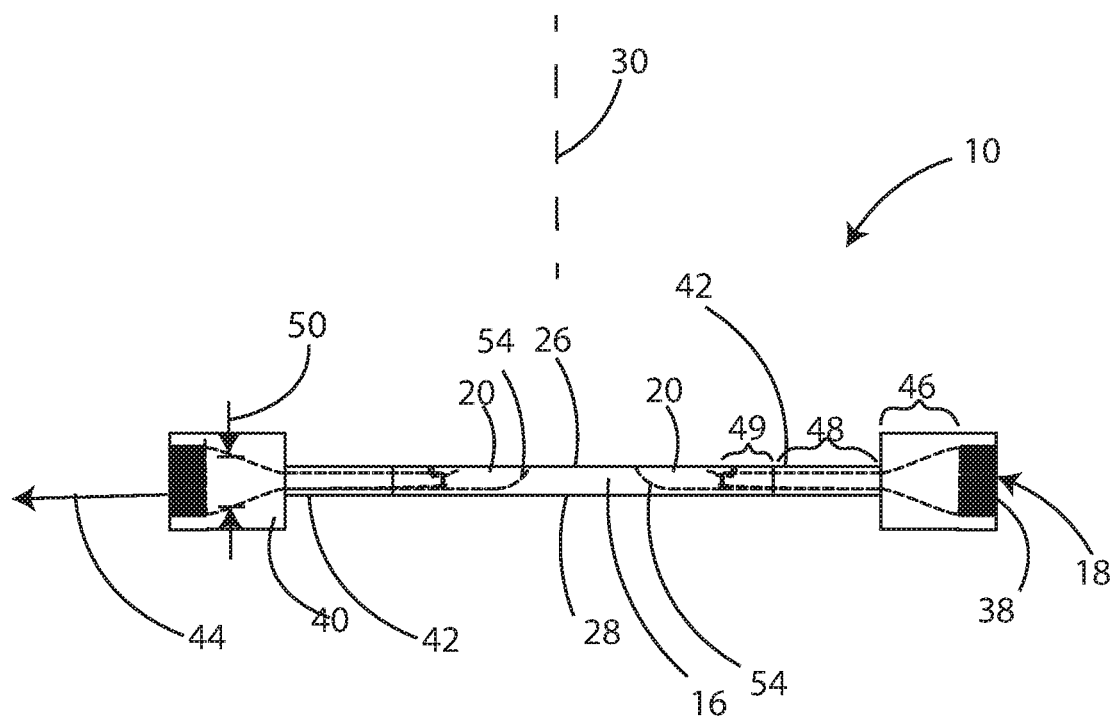
FIG. 3 is a side view of the fluid introducer showing interior features including fluid introduction passaging in broken line.
Figure 4:
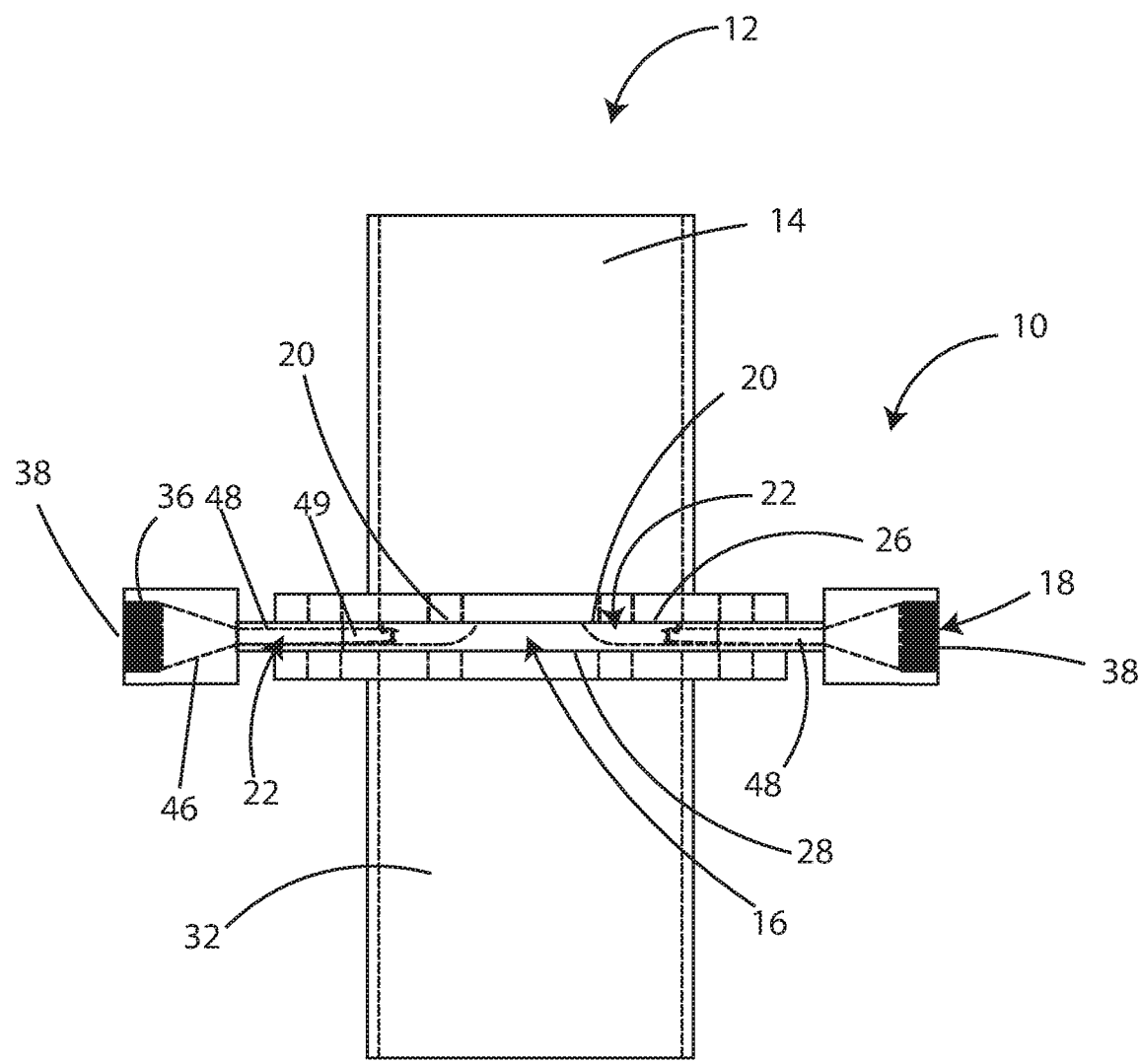
FIG. 4 is an illustration of the fluid introducer showing internal features in broken line.

As seen in FIGS. 1 and 3, the separator body 16 has a generally cylindrical shape defined by a perimeter portion 24, a first end face 26, and a second end face 28. The first and second end faces are spaced apart along an axis 30 of the fluid introducer 10. As best shown in FIGS. 3-4, the separator body 16 may be positioned in the piping system 12 between the first piping section 14 and the second piping section 32 such that the first end face 26 faces the first piping section and the second end face 28 faces the second piping section. The short cylindrical shape allows the separator body 16 to be positioned in an expansion gap 34 (FIG. 2) of the piping system 12. As is known to those skilled in the art, large piping systems are fitted with expansion joints (not shown) that allow for a limited amount of expansion and contraction of the piping system components along the axis of the piping system. When the first and second piping sections 14, 32 are disconnected from one another, one or both of the piping sections can be moved away from the other piping section toward the expansion joint, and the expansion joint will allow for a limited range of movement along the piping system axis. Typically, the expansion joint(s) in a piping system will allow for no more than about 0.3-times the pipe diameter of separation between the first and second piping sections 14, 32 after they are disconnected. Thus, in one or more embodiments the separator body has a thickness extending along the axis 30 from the first end face 24 to the second end face 26, and the thickness is less than or equal to 0.3-times the pipe diameter (e.g., less than 0.275-times the pipe diameter, less than 0.25-times the pipe diameter, less than 0.225-times the pipe diameter, or less than 0.20-times the pipe diameter). In absolute terms, the thickness between the first and second end faces 24, 26 of the separator body 16 can, in certain embodiments (and depending on pipe size and other constraints), be in an inclusive range of from about 0.25 inches to about 4 inches, such as in an inclusive range of from about 0.3 inches to about 3 inches, about 0.35 inches to about 2.5 inches, about 0.4 inches to about 2 inches, about 0.45 inches to about 1.5 inches, or about 0.5 inches to about 1.0 inches.

Figure 5:
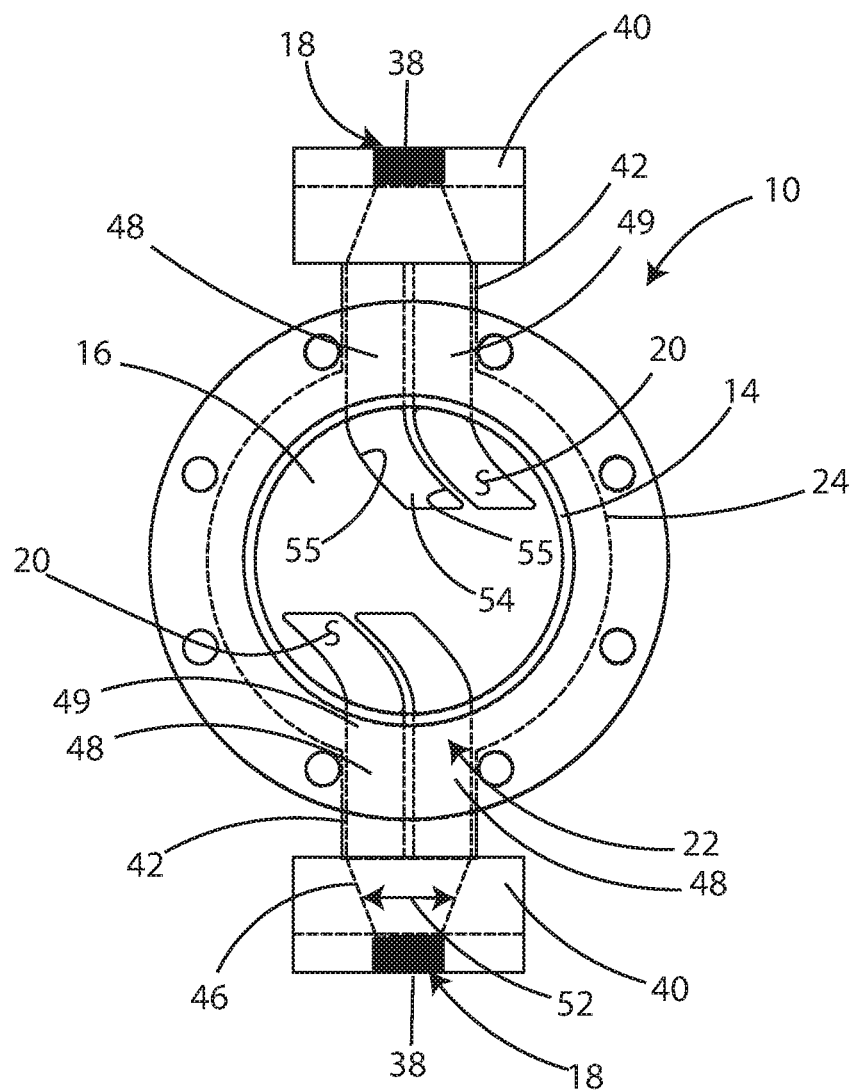
FIG. 5 is an end view of the piping system of FIG. 2, showing internal features and parts of the fluid introducer that are hidden by the first piping section in broken line.

In the illustrated embodiment, the first and second piping sections 14, 32 have flanged ends that are bolted together during normal use of the piping system 12. As can be seen in FIG. 5, the illustrated separator body 16 has an outer diameter that is less than the outer diameter of the flanges but that is greater than the inner diameter of each of the piping sections 14, 32. This allows the piping sections 14, 32 to be disconnected, then pulled apart axially to from the expansion gap 34. After the expansion gap 34 is formed, the separator body 16 is placed in the expansion gap between the opposing flanges such that the flanges can be bolted back together. The bolts extend through the flanges at locations spaced apart radially outward of the perimeter portion of the separator body 16, as seen in FIGS. 2 and 5. It will be understood that the shape of the separator body 16 can vary provided that the shape enables the separator body to be sealed within an expansion gap formed between a first piping section 14 and a second piping section 32 in a way that prevents leakage during use of the introducer 10. More particularly, the separator body forms a seal with the first piping section that prevents fluid flow into the second piping section. In an exemplary embodiment, the separator body is configured to also seal with the second piping section to form a blind on the end of the second piping section.

In accordance with the present embodiment, as best shown in FIG. 4, the outlet ports 20 are included on the first end face 26 of the separator body 16. The outlet ports 20 are configured to discharge fluid into the first piping section 14. The second end face 28 of the separator body 16 does not include any outlet ports 20 so that it can block fluid from entering the second piping section 32. In this way, the second end face 28 forms a piping section closure that is configured to close off the second piping section 32 from fluid communication with the first piping section 14. Thus, the fluid introducer 10 is configured to direct fluid from the fluid source through the fluid introduction passaging 22 into the first piping section 14 while blocking the fluid from flowing into the second piping section 32.

As best shown in FIG. 3, each of the illustrated inlet fittings 18 comprises a fluid block 40 which defines an inlet port 38. Suitably, each inlet fitting 18 includes a fluid coupling for fluidly connecting the introducer 10 to a fluid source (e.g., a hose of a fluid source). In the illustrated embodiment, each fluid coupling comprises an internally threaded portion of the inlet port 38, which can provide a sealed pressure coupling to the fluid source. Other types of fluid couplings may also be used in one or more embodiments. Each fluid block 40 has a greater dimension along the axis 30 than the remainder of the introducer 10. This allows larger hoses to be connected to the introducer 10 and moreover provides additional strength at the inlets 22 so that fluid can enter the introducer at relatively high fluid pressure.

The fluid introducer 10 may further include an arm 42 for supporting each fluid block 40. In general, the arms 42 extend radially outward (e.g., along lines 44) from the perimeter portion of the separator body at circumferentially spaced apart locations about the axis 30. Each arm 42 supports the respective fluid block 40 at a location spaced apart radially outward from the perimeter portion 24 of the separator body 16. The arms 42 thus hold the fluid blocks 40 out from the separator body 16, which makes the inlet fitting 18 more accessible to a user when the separator body is positioned in the expansion gap, as best shown in FIG. 2. In the illustrated embodiment, the arms 42 have first and second end faces that are coplanar with the faces 26, 28, such that the arms have a thickness along the axis 30 that is substantially the same as that of the separator body 16. This is useful because it allows the arms 42 to extend radially across the radially outer section of the piping system flanges (e.g., the illustrated arms 42 are configured to extend in the circumferential gaps located between adjacent flange bolts) so that the inlet fittings 18 are spaced apart radially outward of the pipe flanges in use. In the illustrated embodiment, each of the fluid blocks 46 has a thickness along the axis 30 that is greater than the thickness of the arms 42 and the separator body 16. As can be seen, the thicker blocks 40 allow for a greater diameter inlet ports 38.

As best shown in FIGS. 4-5, the fluid introduction passaging 22 includes passaging segments that extend from each inlet port 38 to at least one of the outlet ports 20. From each inlet port 38, the fluid introduction passaging 22 includes a transition segment 46, an arm segment 48, and a body segment 49. The transition segment 46 extends along an inboard portion of the fluid block 40 and provides fluid communication (and a tapered transition) from the generally cylindrical, large-diameter inlet port 38 to the arm segment 48. The transition segment 46 has an axial inner dimension 50 along the axis 30, as shown in FIG. 3, and a widthwise inner dimension 52 along a width of the arm 42, as shown in FIG. 5. The width of the arm 42 is oriented perpendicular to both the axis 30 and the radial line 44. In the illustrated embodiment, the axial inner dimension 50 decreases as the transition segment 46 extends radially inward towards the separator body 16 (FIG. 3). By contrast, the widthwise inner dimension 52 of the transition segment increases (FIG. 5) as the transition segment 46 extends radially inward towards the separator body 16. As shown in FIG. 4, the transition segment extends radially inward toward the arm 42 and then the passaging bifurcates into parallel arm segment lumens 48 once it reaches the arm.

The arm segment 48 extends along the respective arm 42 and has a flatter, more rectangular cross-sectional shape, which is sized to fit within the envelope of the arm. In one or more embodiments, the inner dimension of the arm segment 48 along the axis 30 is less than 0.275-times the pipe diameter (e.g., less than 0.25-times the pipe diameter, less than 0.225-times the pipe diameter, less than 0.20-times the pipe diameter, less than 0.175-times the pipe diameter, or less than 0.150-times the pipe diameter). The arm segment 48 provides fluid communication between the transition segment 46 and the body segment 49. Each body segment 49 has roughly the same cross-sectional shape as the arm segment 48. Thus, in one or more embodiments, the inner dimension of the body segment 49 along the axis 30 is less than 0.275-times the pipe diameter (e.g., less than 0.25-times the pipe diameter, less than 0.225-times the pipe diameter, less than 0.20-times the pipe diameter, less than 0.175-times the pipe diameter, or less than 0.150-times the pipe diameter). Each body segment 49 extends radially inward along an outer portion of the separator body 16 and provides fluid communication between the arm segment 48 and a respective outlet port 20.

The two separate arm segment lumens 48 are spaced apart along a width of the arm 42. A brace or strut portion of the arm 42 separates the two lumens and provides support for the arm. It will be understood that other arm segments can be formed from other number of lumens (e.g., one or more lumens). As shown, the downstream end of each arm segment lumen 48 opens to a respective body segment lumen 49. Thus, in the illustrated embodiment, the body segment 49 of the fluid introduction passaging 22 is likewise formed from two spaced apart lumens separated by a bracing or strut portion of the separator body 16. Each body segment 49 opens to a respective outlet port 20 of the fluid introducer 10. The bracing or strut portions of the introducer 10 between the adjacent lumens 48, 49 provide sufficient structural support for the introducer to function as a blind on the end of the piping sections at the operating pressures involved.

In the illustrated embodiment, as best shown in FIG. 3, the fluid introduction passaging 22 includes a fluid discharge guide adjacent the downstream end of each body segment lumen 49. Each fluid discharge guide comprises a generally axially facing surface 54 that faces toward the first end face 26 of the separator body 16. The fluid discharge guide further comprises side walls 55 that extend axially from opposite sides of the generally axially facing surface 54. The side walls 55 of each fluid discharge guide are oriented generally parallel to one another and curve away from the respective radial lines 44 as they extend radially inward. Each generally axially facing surface 54 follows between a respective pair of the side walls 55 and extends from a radially outer end portion, which is connected to the body segment lumen 49, to a radially inner end portion, which intersects the first end face 26. It is believed that forming the fluid discharge guide to have parallel side walls (rather than side walls that slant away from each other such that the width of the axially facing surface 54 would gradually increase in the flow direction) enhances the flow capacity of the introducer 10 by minimizing low pressure zones near the outlet ports 20. The radially outer end portion of each generally axially facing surface 54 is oriented substantially perpendicular to the axis 30, while the radially inner end portion is located at a skew angle relative to the axis. The generally axially facing surface 54 curves in an axial direction as it extends from the outer end portion to the inner end portion (following the curvature of the side walls 55). The illustrated fluid discharge guides are configured to guide the fluid flowing out of the body segment lumens 49 in a radially inward direction to flow out of the outlet ports 20 in a more axially oriented direction. Further, the side walls 55 provides a rotational aspect to the flow out of the outlet ports 20. The rotational flow pattern in which the fluid is directed out of the outlet ports 20 is thought to improve flow rate capacity. Further, the rotational flow pattern can enhance foaming of certain cleaning agents which may directed from the introducer 10.

Figure 6:
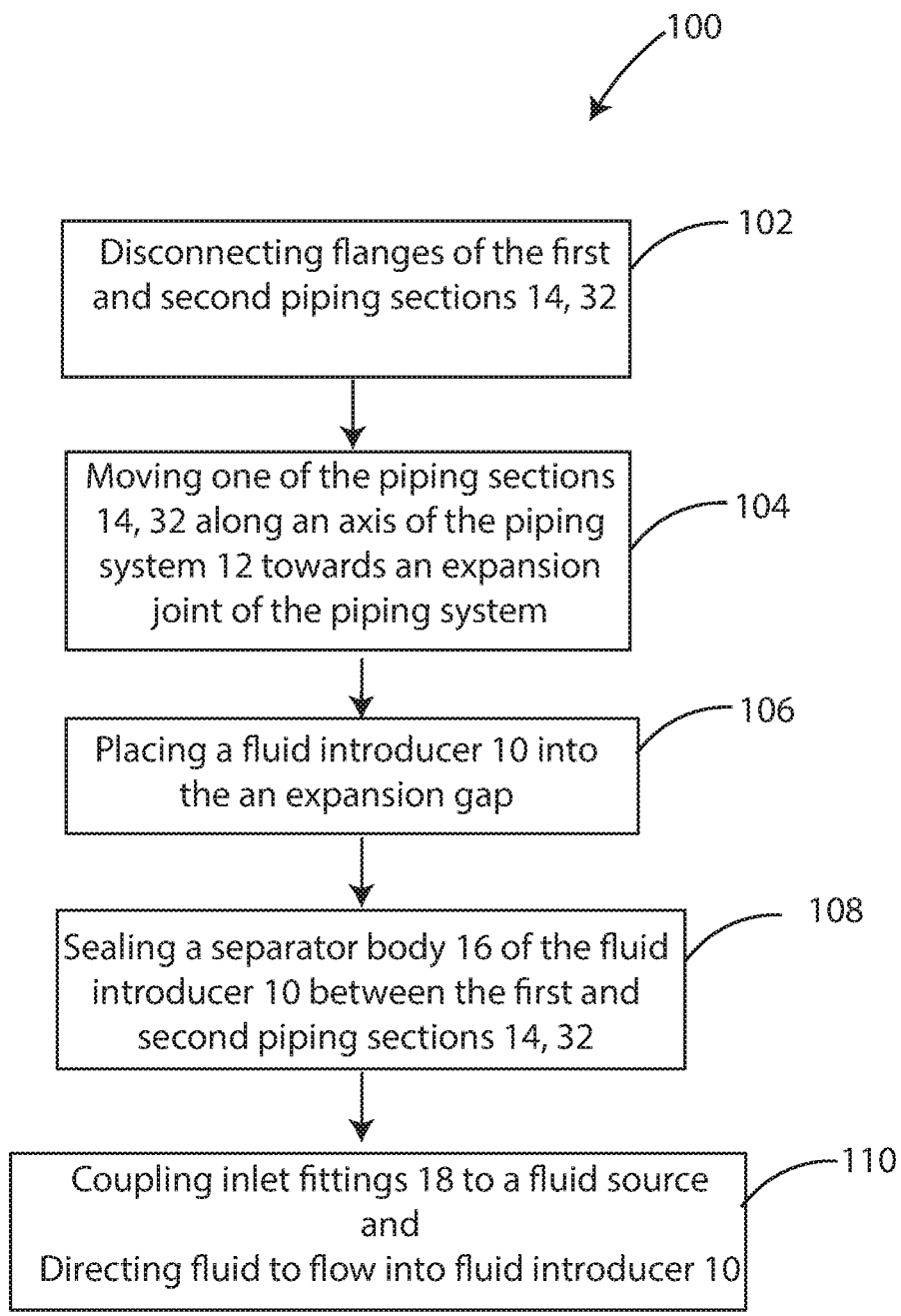
FIG. 6 is a schematic illustration of a method of introducing fluid into a first piping section of a piping system without introducing the fluid into a second piping section of the piping system.

Referring to FIG. 6, a method 100 of introducing fluid into a first piping section 14 of a piping system 12 without introducing the fluid into a second piping section 32 will now be briefly described. Initially, at step 102, the flanges of the first and second piping sections 14, 32 together are disconnected (e.g., by removing bolts). Subsequently, at step 104, one of the first and second piping sections 14, 32 is moved along an axis of the piping system 12 toward an expansion joint of the piping system. The expansion joint allows relative movement of the first and second piping sections 14, 32 along the axis of the piping section to form an expansion gap 34 having a greater dimension along the axis than the thickness of the separator body 16 of the fluid introducer 10. It can be seen that the expansion gap 34 is thus formed without removing any section of the piping system 12.

Next, at step 106, the technician places a fluid introducer 10 into the expansion gap 34. In particular, the technician slides the separator body 16 between the opposed flanges of the first and second piping sections 14, 32. In step 108, the technician seals a separator body 16 of the fluid introducer 10 between the first and second piping sections 14, 32. This can be done by, for example, bolting the flanges of the first and second piping sections 14, 32 together while the separator body is received between them. At step 110, the technician couples the inlet fittings 18 to a fluid source and directs fluid to flow into the fluid introducer 10. The fluid introducer 10 directs the fluid to flow through the fluid introduction passaging 22 into the first piping section 14 and prevents the fluid from entering the second piping section 32.

In one example, the fluid introduced via the fluid introducer 10 is a chemical solution for cleaning or descaling the first piping section of the piping system 12. A downstream end of the first piping section 14 can be fluidly connected to a drain or receptacle which receives the chemical solution during the process. It is to be understood that the first piping section 14 of interest can include pipes, tanks, pumps, and/or valves, etc. When the process is complete, the fluid introducer 10 is disconnected from the fluid source and removed from the piping system 12. The flanges of the first and second piping sections 14, 32 are connected (e.g., bolted) directly together, allowing the piping system 12 to be quickly brought back on line.

The foregoing description has been presented for the purposes of illustration and description. It is not intended to be exhaustive or to limit the disclosure to the precise form disclosed. Many modifications and variations are possible in view of this disclosure. Indeed, while certain features of this disclosure have been shown, described and/or claimed, it is not intended to be limited to the details above, since it will be understood that various omissions, modifications, substitutions and changes in the apparatuses, forms, method, steps and system illustrated and in its operation can be made by those skilled in the art without departing in any way from the spirit of the present disclosure.

Furthermore, the foregoing description, for purposes of explanation, used specific nomenclature to provide a thorough understanding of the disclosure. However, it will be apparent to one skilled in the art that the specific details are not required in order to practice the disclosure. Thus, the foregoing descriptions of specific embodiments of the present disclosure are presented for purposes of illustration and description. They are not intended to be exhaustive or to limit the disclosure to the precise forms disclosed, many modifications and variations are possible in view of the above teachings. The embodiments were chosen and described in order to best explain the principles of the disclosure and its practical applications, to thereby enable others skilled in the art to best utilize the disclosed system and method, and various embodiments with various modifications as are suited to the particular use contemplated.

What is claimed is:

1. A fluid introducer for a piping system comprising a first piping section and a second piping section configured for direct connection to the first piping section, the fluid introducer comprising:
   a separator body having a first end face, a second end face spaced apart from the first end face along an axis, and a perimeter portion extending along the axis from the first end face to the second end face, the separator body being configured to be positioned in the piping system between the first piping section and the second piping section such that the first end face faces the first piping section and the second end face faces the second piping section, the first end face defining an outlet port;
   an inlet fitting adjacent the perimeter portion of the separator body configured to fluidly connect the fluid introducer to a fluid source; and
   a fluid introduction passaging providing fluid communication from the inlet fitting to the outlet port;
   wherein when the separator body is positioned in the piping system between the first piping section and the second piping section, the fluid introducer is configured to direct fluid from the fluid source through the fluid introduction passaging into the first piping section and block the fluid from flowing into the second piping section; and
   wherein the separator body is configured to be received in an expansion gap between the first piping section and the second piping section allowed by an expansion joint of the piping system;
   wherein the separator body has a thickness extending along the axis from the first end face to the second end face, the thickness being less than a maximum expansion gap allowed by the expansion joint of the piping system;
   wherein the thickness is less than 0.3-times a pipe diameter of the first and second piping sections.

2. The fluid introducer of claim 1, wherein the fluid introduction passaging comprises a body segment located along the axis between the first end face and the second end face.

3. The fluid introducer of claim 2, wherein the fluid introduction passaging comprises a fluid discharge guide configured to guide fluid flowing radially through the body segment to be discharged out of the port in another flow direction.

4. The fluid introducer of claim 3, wherein the fluid discharge guide includes a generally axially facing surface axially in a direction of the first end face as the generally axially facing surface extends from an outer end portion connected to the body segment to an inner end portion intersecting the first end face.

5. The fluid introducer of claim 4, wherein the fluid discharge guide further comprises side walls extending axially from opposite sides of the generally axially facing surface, the side walls oriented generally parallel to one another and the side walls curving away from a radial axis as the side walls from adjacent the outer end portion toward the inner end portion.

6. The fluid introducer as set forth in claim 1, wherein the inlet fitting comprises first and second inlet fittings at circumferentially spaced apart locations about the axis, the outlet port comprises first and second outlet ports at spaced apart locations about the axis, and the fluid introduction passaging comprises first passaging providing fluid communication between the first inlet fitting and the first outlet port and second passaging providing fluid communication between the second inlet fitting and the second outlet port.

7. The fluid introducer of claim 1, further comprising an arm extending radially outward from the perimeter portion of the separator body, the arm supporting the inlet fitting on the separator body.

8. The fluid introducer as set forth in claim 7, wherein the arm has a thickness and the separator body has a thickness, the thickness of the arm and the thickness of the separator body being substantially the same.

9. The fluid introducer as set forth in claim 8, wherein the inlet fitting comprises a fluid block connected to the arm, the fluid block having a thickness along the axis that is greater than the thickness of the arm.

10. The fluid introducer as set forth in claim 9, wherein the fluid introduction passaging comprises an inlet port opening through an outer end of the fluid block, a transition segment extending from the inlet port radially inward to the arm, an arm segment extending from the transition segment radially inward toward the outlet port.

11. The fluid introducer as set forth in claim 10, wherein the transition segment has an axial inner dimension along the axis and the axial inner dimension decreases as the transition segment extends radially inward.

12. The fluid introducer as set forth in claim 10, wherein the transition segment has a widthwise inner dimension along a width of the arm oriented perpendicular to both the axis and a radial line along which the arm extends from the axis, the widthwise inner dimension increases as the transition segment extends radially inward.

13. A method of introducing fluid into a first piping section of a piping system without introducing the fluid into a second piping section of the piping system that is directly connected to the first piping section, the method comprising:
  disconnecting the first piping section and the second piping section;
  moving one of the first piping section and the second piping section away from the other of the first piping section and the second piping section using an allowance of an expansion joint of the piping system without removing any of the first piping section or the second piping section from the piping system to create an expansion gap between the first piping section and the second piping section;
  installing the fluid introducer of claim 1 into the expansion gap, wherein the fluid introducer is configured to discharge fluid imparted into the introducer on one side of the introducer while preventing the fluid from being discharged on an opposite side; and
  introducing fluid into the first piping section via the fluid introducer in the expansion gap.

14. A fluid introducer for a piping system comprising a first piping section and a second piping section configured for direct connection to the first piping section, the fluid introducer comprising:
  a separator body having a first end face, a second end face spaced apart from the first end face along an axis, and a perimeter portion extending along the axis from the first end face to the second end face, the separator body being configured to be positioned in the piping system between the first piping section and the second piping section such that the first end face faces the first piping section and the second end face faces the second piping section, the first end face defining an outlet port;
  an inlet fitting adjacent the perimeter portion of the separator body configured to fluidly connect the fluid introducer to a fluid source; and
  a fluid introduction passaging providing fluid communication from the inlet fitting to the outlet port;
  wherein when the separator body is positioned in the piping system between the first piping section and the second piping section, the fluid introducer is configured to direct fluid from the fluid source through the fluid introduction passaging into the first piping section and block the fluid from flowing into the second piping section; and
  wherein the separator body is configured to be received in an expansion gap between the first piping section and the second piping section allowed by an expansion joint of the piping system;
  wherein the fluid introduction passaging comprises a body segment located along the axis between the first end face and the second end face;
  wherein the body segment has an inner dimension along the axis of less than about 0.275-times a pipe diameter of the first and second piping sections.

15. A fluid introducer for a piping system comprising a first piping section and a second piping section configured for direct connection to the first piping section, the fluid introducer comprising:
  a separator body having a first end face, a second end face spaced apart from the first end face along an axis, and a perimeter portion extending along the axis from the first end face to the second end face, the separator body being configured to be positioned in the piping system between the first piping section and the second piping section such that the first end face faces the first piping section and the second end face faces the second piping section, the first end face defining an outlet port;
  an inlet fitting adjacent the perimeter portion of the separator body configured to fluidly connect the fluid introducer to a fluid source; and
  a fluid introduction passaging providing fluid communication from the inlet fitting to the outlet port;
  wherein when the separator body is positioned in the piping system between the first piping section and the second piping section, the fluid introducer is configured to direct fluid from the fluid source through the fluid introduction passaging into the first piping section and block the fluid from flowing into the second piping section; and
  wherein the separator body is configured to be received in an expansion gap between the first piping section and the second piping section allowed by an expansion joint of the piping system;
  wherein the fluid introduction passaging comprises a body segment located along the axis between the first end face and the second end face;
  wherein the body segment comprises first and second parallel body segment lumens.

16. A fluid introducer for a piping system comprising a first piping section and a second piping section configured for direct connection to the first piping section, the fluid introducer comprising:
  a separator body having a first end face, a second end face spaced apart from the first end face along an axis, and a perimeter portion extending along the axis from the first end face to the second end face, the separator body being configured to be positioned in the piping system between the first piping section and the second piping section such that the first end face faces the first piping section and the second end face faces the second piping section, the first end face defining an outlet port;
  an inlet fitting adjacent the perimeter portion of the separator body configured to fluidly connect the fluid introducer to a fluid source; and a fluid introduction passaging providing fluid communication from the inlet fitting to the outlet port;

wherein when the separator body is positioned in the piping system between the first piping section and the second piping section, the fluid introducer is configured to direct fluid from the fluid source through the fluid introduction passaging into the first piping section and block the fluid from flowing into the second piping section; and wherein the separator body is configured to be received in an expansion gap between the first piping section and the second piping section allowed by an expansion joint of the piping system;

wherein the fluid introducer further comprises an arm extending radially outward from the perimeter portion of the separator body, the arm supporting the inlet fitting on the separator body;

wherein the arm has a thickness and the separator body has a thickness, the thickness of the arm and the thickness of the separator body being substantially the same;

wherein the inlet fitting comprises a fluid block connected to the arm, the fluid block having a thickness along the axis that is greater than the thickness of the arm;

wherein the fluid introduction passaging comprises an inlet port opening through an outer end of the fluid block, a transition segment extending from the inlet port radially inward to the arm, an arm segment extending from the transition segment radially inward toward the outlet port;

wherein the arm segment of the passaging is separated into at least two lumens spaced apart along a width of the arm oriented perpendicular to both the axis and a radial line along which the arm extends from the axis.

17. A fluid introducer for a piping system comprising a first piping section and a second piping section configured for direct connection to the first piping section, the fluid introducer comprising:

a separator body having a first end face, a second end face spaced apart from the first end face along an axis, and a perimeter portion extending along the axis from the first end face to the second end face, the separator body being configured to be positioned in the piping system between the first piping section and the second piping section such that the first end face faces the first piping section and the second end face faces the second piping section, the first end face defining an outlet port;

an inlet fitting adjacent the perimeter portion of the separator body configured to fluidly connect the fluid introducer to a fluid source; and a fluid introduction passaging providing fluid communication from the inlet fitting to the outlet port;

wherein when the separator body is positioned in the piping system between the first piping section and the second piping section, the fluid introducer is configured to direct fluid from the fluid source through the fluid introduction passaging into the first piping section and block the fluid from flowing into the second piping section; and wherein the separator body is configured to be received in an expansion gap between the first piping section and the second piping section allowed by an expansion joint of the piping system;

wherein the fluid introducer further comprises an arm extending radially outward from the perimeter portion of the separator body, the arm supporting the inlet fitting on the separator body;

wherein the arm has a thickness and the separator body has a thickness, the thickness of the arm and the thickness of the separator body being substantially the same;

wherein the inlet fitting comprises a fluid block connected to the arm, the fluid block having a thickness along the axis that is greater than the thickness of the arm;

wherein the fluid introduction passaging comprises an inlet port opening through an outer end of the fluid block, a transition segment extending from the inlet port radially inward to the arm, an arm segment extending from the transition segment radially inward toward the outlet port;

wherein the inlet port is internally threaded.

* * * * *